Aug. 6, 1957 J. L. LINDAUER, JR 2,801,663
PIZZA PIE CUTTER
Filed May 25, 1956 4 Sheets-Sheet 1

Inventor
JOSEPH L. LINDAUER, JR.
by: Carlson, Pitzner, Hubbard & Wolf
attys.

Aug. 6, 1957  J. L. LINDAUER, JR  2,801,663
PIZZA PIE CUTTER

Filed May 25, 1956  4 Sheets-Sheet 2

Inventor
JOSEPH L. LINDAUER, JR.
by: Carlson, Pitzner, Hubbard & Wolfe
Attys.

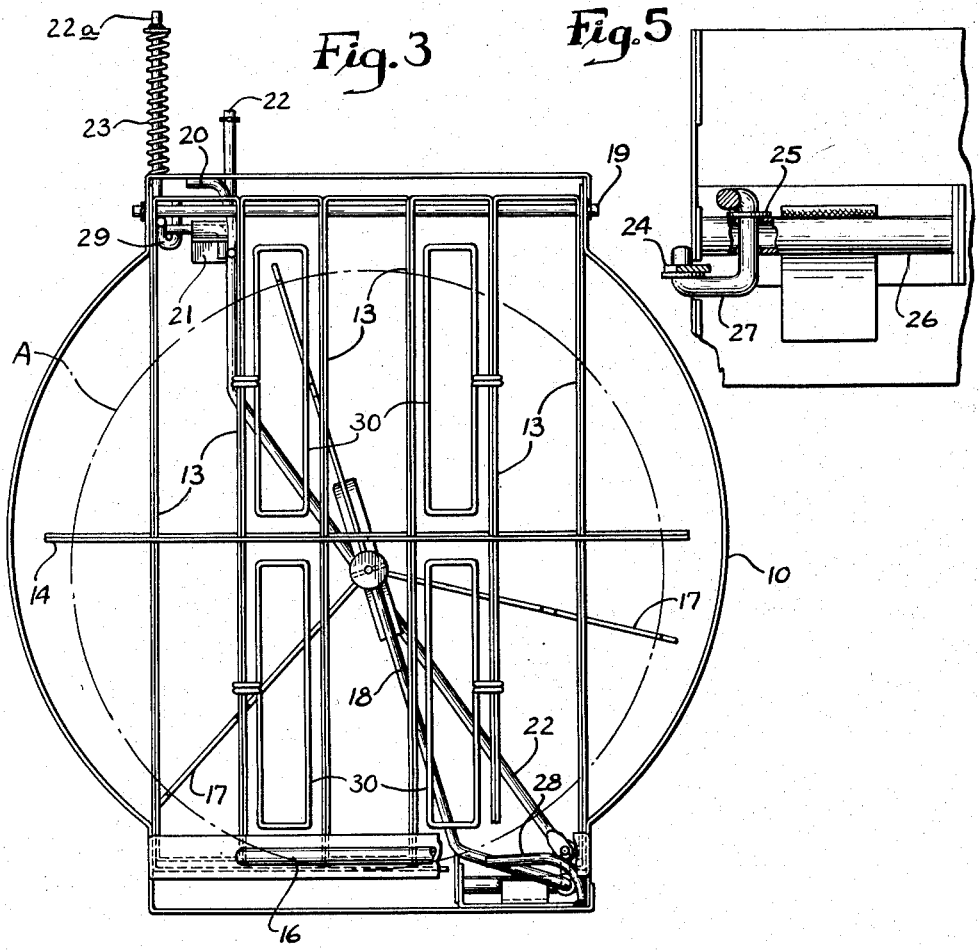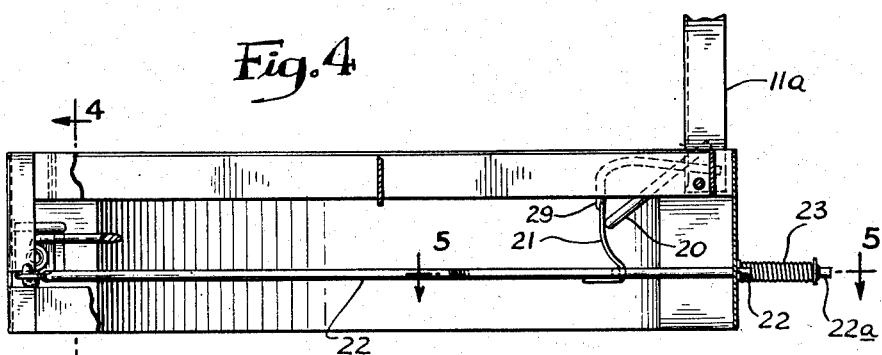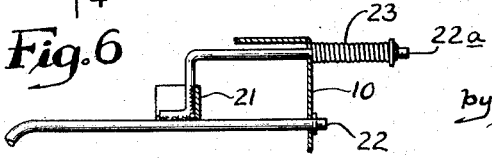

Aug. 6, 1957  J. L. LINDAUER, JR  2,801,663
PIZZA PIE CUTTER
Filed May 25, 1956  4 Sheets-Sheet 4

Inventor
JOSEPH L. LINDAUER, JR.
by: Carlson, Pitzner, Hubbard & Wolfe
attys.

United States Patent Office 2,801,663
Patented Aug. 6, 1957

2,801,663

PIZZA PIE CUTTER

Joseph L. Lindauer, Jr., Chicago, Ill.

Application May 25, 1956, Serial No. 587,399

4 Claims. (Cl. 146—147)

This invention relates to a device for cutting hot, tacky, hard-surfaced food products, such as pizza pies, into a plurality of substantially uniform portions. More specifically, it is concerned with the single-stroke cutting of hot pizza pies, ordinarily having the shape of large pancakes, into acceptably sized portions, and the automatic disposition of the cut pieces onto a serving tray.

As is well known to those who have eaten, and particularly to those concerned with the cooking and selling of pizza pies, the customer requires that the product be divided into easily handled portions prior to distribution. Such products are sold to be eaten while hot, and a hot pizza pie (usually predominating in cheese) is a difficult item to cut cleanly and quickly without affecting the overall geometry and appearance of the product. It is the general practice for restaurants selling pizza pies to purvey them to the customer while hot, disposed on a cardboard or metal tray, and cut into a number of easily handled, substantially uniform pieces. At the present time, pizza cutting is almost always done with a large hand-wielded carving knife, and with varying degrees of effectiveness.

The cutting of pizza pies involves somewhat more effort and skill than would ordinarily be involved in the cutting of food products of similar shape and size. The principal difference resides in the combination of the rather gummy, adherent texture of the hot pie with the inherent resistance to cutting of the crust.

It is a primary object of the present invention to simplify, and at the same time speed up the cutting of pizza pies and the like, which are dispensed to the public while hot, in a plurality of substantially equal sized pieces. A further object is to eliminate the possibility of cutting the fingers and hands of persons involved in purveying pizza pies to the public. Still another object is to assure freedom from destruction of the eye-appealing appearance of the whole pie while permitting ease of cutting into properly sized portions. These and additional objects and advantages will be apparent from the ensuing description of my invention.

Briefly described, my device for cutting pizza pies into a plurality of substantially equal sized portions, comprises a base support member usually placed upon a table, which embodies a gridiron shaped to the desired configuration of the portions into which the pizza is to be cut; each of the cross-pieces of the gridiron is preferably thin gauge stainless steel, e. g., one-thirty-second to about one-eighth inch, or other sturdy metal having a beveled (sharpened) edge adapted to coact with a cooperating upper gridiron of cutting edges hinged thereto. The hinged upper gridiron coacts with the lower gridiron in such manner that when the pizza pie is placed on the lower gridiron and the upper hinged section is lowered forceably onto the pizza pie, each of the portions thereof is forced through the gridiron onto a cardboard or other retainer positioned immediately therebelow. An especially important feature of the present invention resides in the automatic positioning of the cardboard, or other tray, firmly beneath the lower gridiron so as to receive without danger of spilling or dropping, the cut pieces of pizza. In operation, the retainer for the cut pieces of pizza pie is automatically moved under the lower gridiron and positioned up tightly therebeneath in the same motion and as a result of the operator's downward movement of the hinged cutting knives against the pizza pie. Thus, the downward movement of the upper hinged cutting section results in actuation of a pivoted arm which carries the tray for receiving the cut pizza. After forcing the cutting edges down against the pie and thereby, at the same time, forcing the cut portions of the pizza pie onto the retainer therebelow, the cutting portion is again raised upwardly. As a result of the return to the vertical position of the upper cutting section, the tray containing the cut portions of pizza pie is automatically moved out from under the gridiron and is in position to have a bag or other container placed immediately therearound. The mechanisms resulting in the automatic movement of the cardboard tray upon actuation of the upper set of cutting edges will be described in greater detail in connection with the detailed description of this invention.

In the accompanying drawings, to which the following detailed description will refer:

Fig. 3 is a plan view of the device at the completion of the cutting of the pizza, with the upper hinged section moved into cooperation with the lower gridiron.

Fig. 4 is a side elevated view in partial section of the device, showing the cam and linkage by which the arm bearing the cardboard plate is moved in and under the gridiron.

Fig. 5 is an enlarged detail view taken from Fig. 4, of additional linkages employed to actuate the cardboard bearing arm in and out from under the gridiron.

Fig. 6 is a detail in plan, showing the spring and mechanical linkage pressing the cardboard plate firmly against the under side of the gridiron on which the pizza pie is initially placed.

Figure 1:
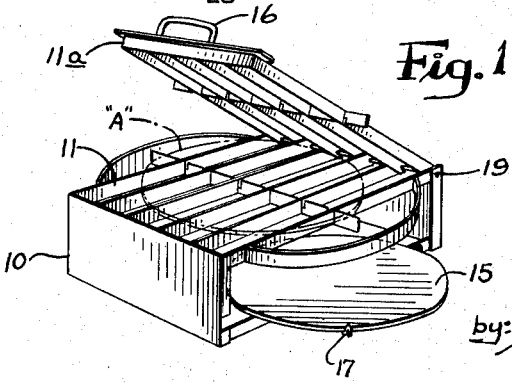
Fig. 1 is a perspective view of the cutting device showing on a reduced scale the general arrangement of principal parts.

Referring now to the drawings, Fig. 1 shows a perspective view of the cutter of the present invention, with the hinged upper cutting section 11a in an open, but not quite vertical, position. The supporting frame is designated 10, and this surrounds the lower gridiron 11 which is composed of a plurality of substantially equally sized rectangular divisions formed by the six parallel members 13, and the intersecting member 14. Members 13 and 14 are preferably of thin gauge stainless steel of, for example, about one-sixteenth inch thickness. They may be of varying heighth (width), e. g., from about one-half inch to about an inch. This dimension is not critical, but should be sufficient to lend strength to the device. As shown in the drawings, the ten rectangular divisions are closed at opposite ends. As will be apparent to one skilled in the art the particular design of the lower gridiron and the cooperating upper cutting section is subject to almost unlimited variation. The design shown, therefore, may be varied considerably without departing from this invention so long as relative movement of upper section against lower gridiron results in single stroke cutting of pizzas or similar objects.

In Fig. 1, the disposable tray 15 for receiving the cut pieces of pizza is in a position somewhat in from its completely extended position, indicating that it has begun to move under the gridiron as a result of the downward movement of the upper hinged section, under the urging of the operator's hand (not shown) grasping handle 16. The pizza A is shown resting (in dotted outline) on gridiron 11, and it should be understood (as will be more completely described below) that as the uper hinged section is forced down against the pizza, the same is cut into a plurality of pieces (in the case of the device shown— fourteen) which are then forced through the lower gridiron 11 onto the cardboard plate 15 which has, simultaneously with the downward movement of the upper cutting section, moved into position below the gridiron and is forced firmly up against the underside thereof to receive the cut pieces of pizza.

Figure 2:
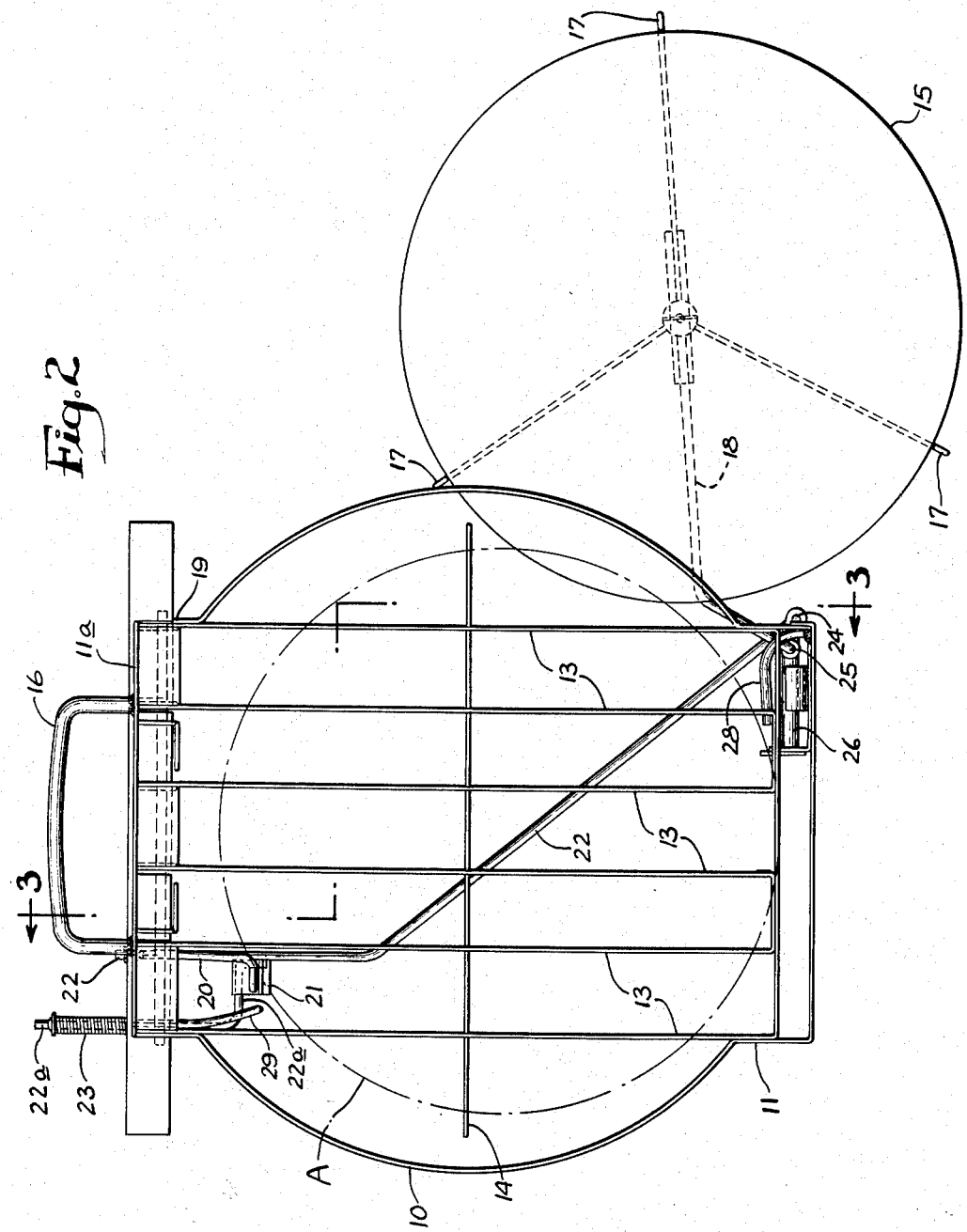
Fig. 2 is a plan view of the cutting device, in position ready to receive a hot pizza for cutting, with the hinged upper section in a vertical position, and the arm bearing the cardboard retainer shown in the extended position.

Now, referring to Fig. 2, which is a plan view of the cutter with the upper hinged portion is a completely vertical position, it can be seen that the cardboard tray 15, positioned on arms 17, which radiate from the end of arm 18, is extended out from under the gridiron in its farthest position. After placing the pizza on top of the lower gridiron section, i. e., on top of the beveled members 13 and 14, the handle 16 is grasped by the operator and pressure brought to bear to force the upper section down firmly against the pizza, resulting in cutting of the same. The upper section 11a is hinged or pinned at 19.

Figure 10:
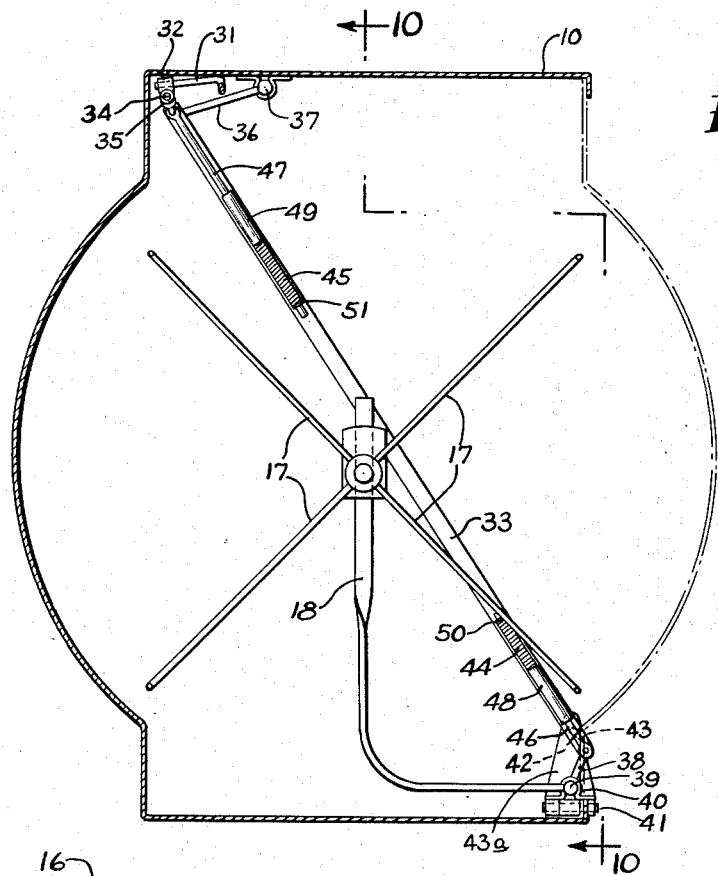
Fig. 10 is a plan view similar to that shown in Fig. 3, but taken below the lower gridiron showing linkages for producing the movement of the tray in and out from under the gridiron.
Figure 11:
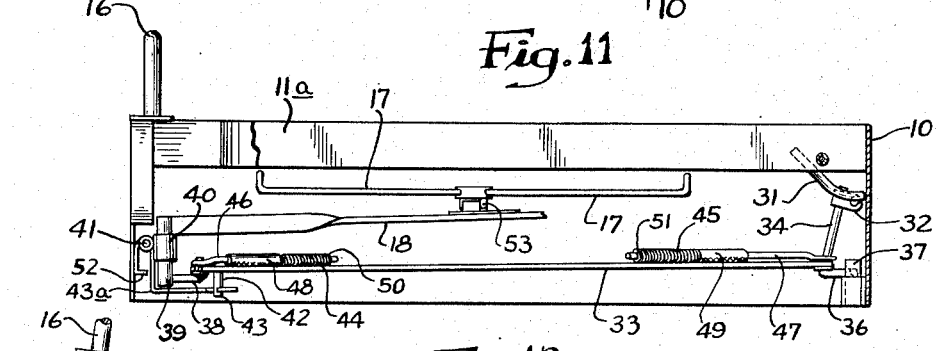
Fig. 11 is a sectional elevation of the alternative form of the apparatus depicted in Fig. 10 with parts added showing the arrangement of linkages for actuation on the tray-bearing arm and showing the free end of said arm in its position at completion of the cutting action.
Figure 12:
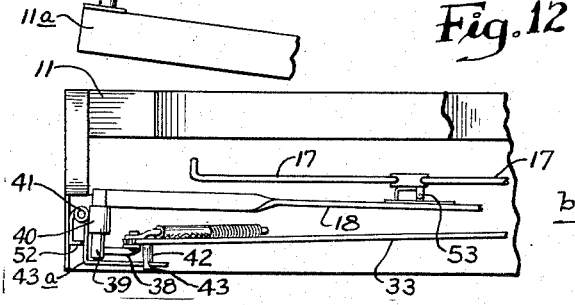
Fig. 12 is a partial sectional side elevation of the mechanism for pivoting the tray-bearing arm of Figs. 10 and 11 showing the vertical position of the free end of such arm just before completion of the cutting action.

The same numbers are employed to designate like parts in all of the attached drawings. In following the description of the construction and operation of the novel device, the reader should refer principally to Figs. 2 and 3 for general orientation and then Figs. 4 through 9 for a clearer understanding of certain specific details, which are better observed therein. Figs. 10 through 12 show one of the many possible alternative forms of the invention. Specific reference will, of course, be made to certain drawings where such is considered particularly desirable.

Figure 8:
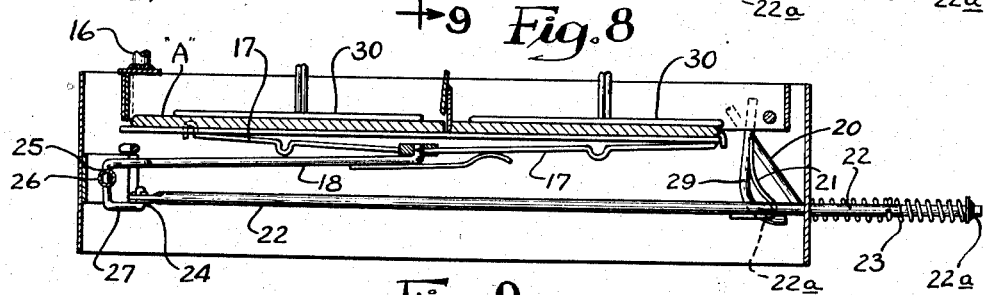
Fig. 8 is essentially the same side elevational view in section as Fig. 7, but showing the cardboard plate on the movable arm forced upwardly against the under side of the gridiron.
Figure 9:
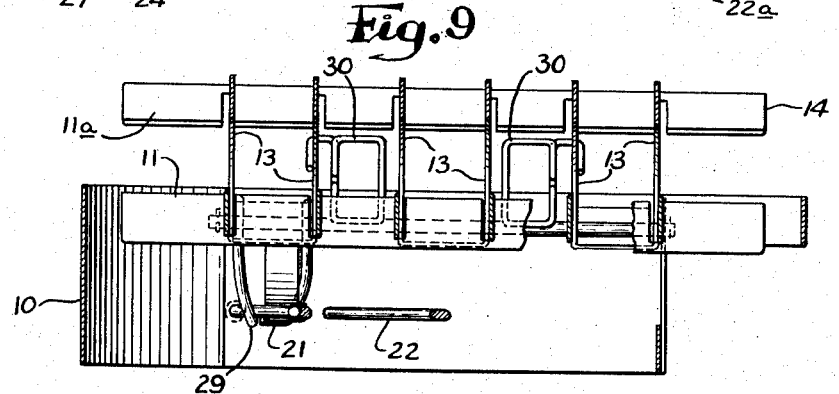
Fig. 9 is a side elevational view taken from Fig. 7, showing in greater detail the linkage responsible for pressing the plate and arm firmly up against the under side of the gridiron.

With the upper cutting section 11a in the vertical position, as shown in Fig. 2, L shaped rod 20, having a diameter, for example, of about one-eighth inch, may be seen soldered or welded along its upper long end, i. e., at the top of the leg of the L to the base of the second transverse member 13 of the movable upper cutting piece 11a. Rod 20 is permanently affixed to the member 13 which it abuts so that the foot of the L is horizontal and so that the toe of the L is pointed outward from the transverse member 13 to which it is affixed. When the cutting device 11a is completely closed, i. e., in the horizontal position as shown in Fig. 3, L member 20 is essentially in contact along its foot with the rear portion of support 10, and the leg of the L, as seen in Fig. 8, makes an angle with such support, of about forty-five degrees.

As shown particularly in Fig. 2 and Fig. 4 when the upper cutting section 11a is vertical, the foot of the L shaped member 20 bears against curved cam surface 21. Cam surface 21 is a curved piece of metal soldered or welded to an extension of member 22 which extension is at right angles to members 13. Member 22 is the main rod through which the motion of the downward movement of upper section of 11a is transmitted to arm 18, which in turn moves the tray 15 in and out from the lower gridiron 11. The extension of rod 22 to which cam surface 21 is affixed, is designated 22a and as seen in the drawings has spring 23 positioned between a stop at the outer end of 22a, and the outside of the back wall of supporting structure 10.

In operation, as handle 16 is grasped by the operator and the upper cutting section is lowered, member 20 begins to move down and out of contact from cam surface 21. As member 20 leaves contact with cam surface 21, compressed spring 23 takes over and, as it opens, exerts lateral force on 22a which force in turn is transmitted to member 22 and ultimately to arm 18, resulting in positioning of the tray as will be more fully described.

As tension is relieved from spring 23 (as shown in Fig. 2) upon movement of the foot of L member 20 down and away from cam surface 21 during the lowering of upper section 11a, the force of the spring is exerted against the stop on the extremity of 22a causing 22a to laterally extend farther out from the side of support 10. As a result of such lateral movement, as explained above, the same lateral force is imparted to member 22 which is also pulled laterally in the same direction, causing it to likewise extend out considerably farther from the support 10. The change in the positions of the ends of rods 22 and 22a from the open to closed position of the device described, can be observed most readily by comparing Fig. 2 and Fig. 3. As a result of the lateral motion of rod 22 resulting from the release of spring 23 lateral force is exerted in that same direction on vertical member 24 which is journaled in the end of rod 22. As seen in the drawings, vertical member 24, which appears as a pin in the end of rod 22, is an extension of arm 18 which has been bent in the manner shown. The lateral force exerted on pin 24 causes rotation of the entire assembly in socket 25 in horizontal support 26. This arrangement makes for a firm, positive linkage, but it may be found that certain production requirements will dictate other methods of forming the continuous piece required for accurate response. As lateral force is exerted on member 22 lower horizontal extension 27 of arm 18, is pivoted in socket 25 from the position shown in Fig. 2 to that shown in Fig. 3. As a result of such motion, arm 18 is swung from the extended position shown in Fig. 2 to a position directly under gridiron 11, as shown in Fig. 3. Arm 28 is a guide to assure proper positioning of the arm 18 bearing the tray 15 as it moves below the gridiron 11.

Figure 7:
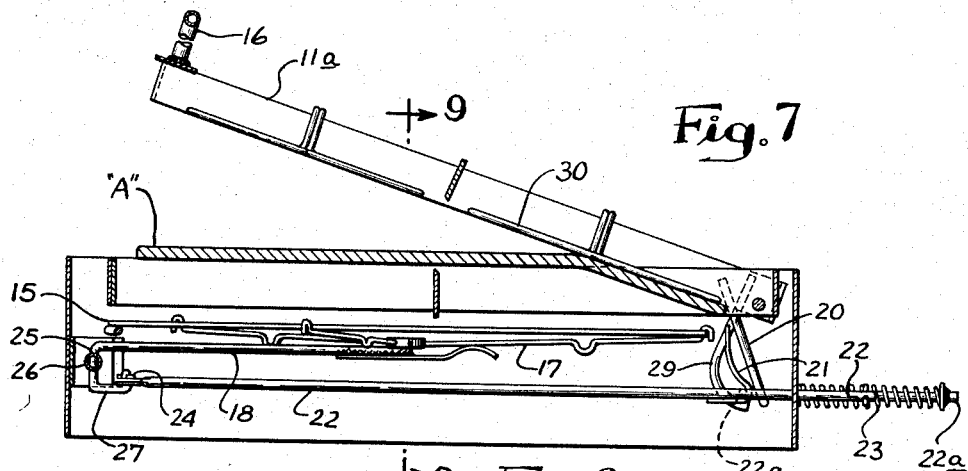
Fig. 7 is a side elevational view in section of the cutting device, showing the upper hinged cutting section in a position about one-third of the way from the gridiron, and in such position the movable arm bearing the cardboard plate is shown directly below the gridiron, but as yet not pressed up against the under side thereof.

Referring now to Figs. 2, 7, and 8, the manner in which the tray 15, after having been positioned below the gridiron 11, is pressed firmly up against the base of gridiron 11 can be clearly observed. Thus, curved arm 29 which is soldered or welded to the outside member 13 in such manner that in the almost completely closed position of upper section 11a it engages horizontal extension 22a of member 22 at a point where such extension is perpendicular to member 22 and before such extension 22a bends to become parallel to member 22. After engagement of arm 29 with extension 22a the continued closing of the upper section 11a (and there is only a very short distance remaining before full closure at this point) positive lateral force is imparted to member 22 resulting in an additional lateral movement of lower extension 27 of arm 18 in the same direction. The vertical section of arm 18 which rotates in socket 25, as a result of a substantial amount of play in such a socket, is tilted slightly, causing arm 18 to move up and to thus force the tray 15 firmly against the under side of gridiron 11.

Upon completing closure of upper section 11a it is then immediately raised and the cut pizza in tray 15 is as a result of the upward movement of 11a swung out by opposite action of all the linkages, springs and cams above described, and ends up in the position shown in Fig. 2, ready for wrapping and delivery to the customer.

The rectangular members 30 are permanently affixed to upper cutter 11a for the purpose of assuring downward movement of the cut pieces of pizza in those areas of the gridiron where relative motion of upper and lower cutting members does not occur.

In Figs. 10, 11 and 12 is shown an alternative mechanical system for accomplishing the automatic movement of the tray under and out from beneath lower gridiron 11. Thus, Fig. 10 is a plan view taken just below gridiron 11 showing a second mechanical embodiment of the invention.

In Fig. 10 is shown the relation of the various members as they appear upon completion of a cutting action. No tray or pizza is shown for the sake of simplicity but it will be understood that the same could be disposed upon arms 17 radiating from the end of arm 18.

For purposes of understanding the alternative mechanisms shown in Figs. 10, 11 and 12 it should be understood that the description will begin at a point immediately after the cutting of a pizza has been completed in order to show how the tray bearing the cut pizza (not shown) is moved out from under the lower gridiron.

Thus, handle 16 is grasped by the operator and as it is raised, causing upper gridiron 11a to swing up and away from lower gridiron 11, radial members 17 bearing the tray (not shown) first drop a short distance in a vertical direction due to the forward movement of L shaped member 31, which is similar in design and orientation to member 20 shown in Fig. 1 through Fig. 10. Thus, the forward movement of the foot of L shaped member 31, which is journaled in horizontally disposed ring bearing 32 results in such movement being transmitted to transverse rod 33 via vertical rod 34 which moves in a slidable manner within the vertically disposed ring bearing 35 which is welded or soldered at right angles to bearing 32. Vertical rod 34 is an extension of horizontal member 36 which is pivoted at the bracket 37 affixed to the inside of wall 10.

The lateral movement of transverse rod 33 causes horizontal member 38 to pivot about axis 39 in bracket 40 which is hingedly affixed to the inside wall of structure 10 at pin 41. As member 38 pivots the radial motion is transmitted to arm 18 which is permanently affixed to axis 39 at its top. As member 38 continues to be forced out from under lower gridiron 11, arm 18 pivots in like manner until it is fully extended at the point when upper cutter gridiron 11a has reached its vertical position.

Now, referring again to Fig. 11 where the tray bearing arms 17 are shown in their uppermost vertical position it may be seen that vertical member 42, which is permanently affixed at right angles to transverse rod 33 at about its extremity, has engaged hook 43 which is part of L shaped member 43a which in turn is permanently affixed at its upper end to the back of bracket 40.

As a result of the final movement (during closing of the cutter) of the foot of L member 31 toward the rear wall of structure 10, pin 34 is engaged through bearings 32 and 35 and transverse member 33 exerts a final pull, through vertical pin 42, on hook 43, which in turn causes the entire bracket 37 to pivot upward on pin 41. This causes radial members 17 at the end of arm 18 to force the tray up firmly against the underside of gridiron 11.

Springs 44 and 45 are disposed around rods 46 and 47 respectively. Rods 46 and 47 extend through sleeves 48 and 49 with their outside ends being pinned at 42 and 34 to the ends of rod 33. Sleeves 48 and 49 are permanently affixed to rod 33. Springs 44 and 45 are held on rods 46 and 47 between stops 50 and 51 and sleeves 48 and 49. Springs 44 and 45 and rods 46 and 47 permit the extra flexibility required during the final closing of the upper cutter to permit the tray to be under the gridiron 11 before any cutting occurs and yet to allow the complete closing of the upper cutter with attendant tilting of the entire arm and bracket assembly to cause the final upward movement of the tray bearing arm.

As may be seen in Figs. 11 and 12 when the tray is in its uppermost position (the upper cutter being completely closed) L shaped member 43a has moved away slightly from its stop 52 projecting from the wall of structure 10. After the cutting has been completed and the tray pressure mechanism has been released (as shown in Fig. 12) L member 43a falls back against stop 52. In these same drawings the mechanism for assuring leveling of the tray in its uppermost position may be seen. Thus, the entire set of radial arms 17 are hinged at pin 53 to arm 18. This results in a level tray despite tilted arm 18 as shown in Fig. 11.

While two somewhat different embodiments of the invention have been described and shown in the drawings it should be understood that these are not the only ones possible, and with the explanations herein given it is deemed possible for one skilled in the art to make certain mechanical changes to arrive at the same result. It is intended to cover by the appended claims all mechanically equivalent embodiments of the described apparatus.

Having thus described my invention, what I desire to claim as novel and to protect by Letters Patent is as follows:

1. In combination with upper and lower hinged cutting members adapted to cut objects placed therebetween, a pivotable arm capable of lateral movement beneath the underside of the said lower cutting member, means responsive to the movement of said upper cutting member for converting said movement to lateral movement of said pivotable arm and means disposed at the free end of said pivotable arm for receiving the cut pieces of said object.

2. In combination with movable upper and stationary lower hinged cutting members adapted to cut a hot pizza pie into a plurality of pieces when the same is placed on said lower member and said upper section is forced down thereupon, means for receiving the cut pieces of pizza pie at the conclusion of the cutting action, means for automatically moving said receiving means from under said lower cutting member as the said upper member is returned to the pre-cutting position, a pivotable arm hingedly affixed to said lower member and connected to said receiving means at its free end, means responsive to the movement of said upper member for converting movement of said upper section to lateral, radial movement of said arm.

3. A pizza pie cutter comprising movable upper and fixed lower cutting gridirons adapted to subdivide said pie upon coaction of the two gridirons, means for receiving the cut pieces of pie, beneath said lower gridiron, a pivotable arm hingedly affixed to the support of said lower cutting gridiron and capable of radial movement under the said lower cutting gridiron which arm is affixed at its free end to said receiving means, means responsive to the movement of said upper cutting gridiron for connecting the same into lateral, radial movement of said pivotable arm and thereby causing said arm to move under the lower gridiron during the downward, cutting stroke of the upper gridiron and to move out from under the same during the return of said upper cutting gridiron to the precutting position.

4. The pizza pie cutter of claim 3 which includes auxiliary means for imparting vertical movement to the receiving means in order to force the same up against the underside of said lower gridiron, said means for imparting vertical movement to said receiving means being actuated during the final stage of the cutting action and only after the lateral, radial movement of said arm has been substantially completed.

References Cited in the file of this patent

UNITED STATES PATENTS

| | | |
|---|---|---|
| 2,224,655 | Miller | Dec. 10, 1940 |
| 2,239,430 | Spang | Apr. 22, 1941 |

FOREIGN PATENTS

| | | |
|---|---|---|
| 702,637 | Great Britain | Jan. 20, 1954 |